(12) United States Patent
Gomez (10) Patent No.: US 7,131,659 B2
(45) Date of Patent: Nov. 7, 2006

(54) HITCH

(76) Inventor: Roddy M. Gomez, 8504 Gray Iron Ct., Antelope, CA (US) 95843

( * ) Notice: Subject to any disclaimer, the term of this patent is extended or adjusted under 35 U.S.C. 154(b) by 0 days.

(21) Appl. No.: 10/845,294

(22) Filed: May 13, 2004

(65) Prior Publication Data

US 2005/0253362 A1    Nov. 17, 2005

(51) Int. Cl.
*B62D 1/52*    (2006.01)
(52) U.S. Cl. .................................. 280/491.5
(58) Field of Classification Search ............ None
See application file for complete search history.

(56) References Cited

U.S. PATENT DOCUMENTS

| 2,444,876 | A | | 7/1948 | Kuhl |
| 4,459,832 | A | | 7/1984 | Avrea et al. |
| 4,571,964 | A | | 2/1986 | Bratzler |
| 4,613,149 | A | | 9/1986 | Williams, Jr. |
| 5,154,440 | A | | 10/1992 | Dolan et al. |
| 5,358,269 | A | | 10/1994 | Jakeman et al. |
| 5,647,604 | A | | 7/1997 | Russell |
| 5,702,118 | A | * | 12/1997 | Hanson et al. ........... 280/491.5 |
| 5,730,456 | A | | 3/1998 | Bowers |
| D401,196 | S | | 11/1998 | Hartwig |
| 5,853,187 | A | | 12/1998 | Maier |
| 6,155,587 | A | | 12/2000 | Milazzo |
| 6,173,984 | B1 | | 1/2001 | Kay |
| 6,203,048 | B1 | | 3/2001 | Adair |
| 6,502,845 | B1 | | 1/2003 | Van Vleet |
| 6,896,282 | B1 | * | 5/2005 | McKinley ................... 280/495 |

* cited by examiner

Primary Examiner—Tony Winner
(74) Attorney, Agent, or Firm—Gross & Associates (57) ABSTRACT

The present invention is a hitch for coupling a towing vehicle to a vehicle to be towed. In one embodiment, the hitch comprises a receiver portion having a channel operably configured to receive an insert member and a connection portion disposed adjacent to the receiver portion and having a chamber with an orifice extending through the chamber, an edge defining an opening of the chamber, first and second notches disposed opposing each other along the edge, and first and second coaxial opposing flanges disposed about the orifice, within the chamber and apart from each other at a predetermined distance. Further the hitch may comprise a shaft having first and second ends, where the second end inserts into the orifice of the connection portion and the first end having a diameter larger than the shaft such that it forms a plate surface on the connection portion. In an alternative embodiment, the hitch includes a receiver portion having an integral ball mount.

15 Claims, 7 Drawing Sheets

HITCH

BACKGROUND

1. Field of the Invention

The present invention relates to trailer hitches and a method of easily attaching a trailer hitch to a vehicle. In particular, the present invention provides a trailer hitch for vehicles that do not come equipped with a trailer hitch without the need for any costly modification or alteration of the vehicle.

2. Background of the Invention

Trailer hitches are used to provide rotatable mechanical coupling between a towing vehicle and a trailer. The mechanical coupling is preferable around all three axes, to allow the trailer to be towed around turns, up and down inclines and over uneven pavement.

In addition, towing mechanisms and hitches can be expensive and difficult to assemble and attach to the vehicle. Many of the available towing mechanisms and hitches require much time and effort to install, often requiring permanent attachment to the vehicle, which may not be aesthetically pleasing.

Hence, what is needed is a hitch or towing mechanism that will provide effective towing action. There is also a need for a hitch that is convenient to use, stable, has ease of use and is easily attachable and detachable. Finally, the hitch must provide a sure, solid connection so that the operator of the vehicle can safely and confidently perform towing operations.

SUMMARY OF THE INVENTION

The present invention provides a hitch for coupling a towing vehicle to a vehicle to be towed. The hitch includes a receiver portion and a connection portion. The connection portion is operably configured to engage a connector disposed on a vehicle, wherein the connector has a vertical loop-like shape. The receiver portion is operably configured to receive a ball mount or other insert member.

The present invention comprises a hitch for coupling a towing vehicle to a vehicle to be towed. In one embodiment, the hitch comprises a receiver portion and a connection portion. The receiver portion has a channel operably configured to receive an insert member. The connection portion is disposed adjacent to the receiver portion and has a chamber with an orifice extending through the chamber, an edge defining an opening of the chamber, first and second notches disposed opposing each other along the edge, and first and second coaxial opposing flanges disposed about the orifice, within the chamber and apart from each other at a predetermined distance. The hitch further includes a shaft having first and second ends, where the second end inserts into the orifice of the connection portion and the first end has a diameter larger than a central portion of the shaft such that it forms a plate surface.

In another exemplary embodiment, the present invention provides a hitch comprising a receiver portion having an integral ball mount and a connection portion being disposed adjacent receiver portion. The connection portion and having a chamber with an orifice extending through the chamber, an edge defining an opening of the chamber, first and second notches disposed opposing each other along the edge, and first and second coaxial opposing flanges disposed about the orifice, within the chamber and apart from each other at a predetermined distance.

A better understanding of the features and advantages of the present invention will be obtained by reference to the following detailed description of the invention and accompanying drawings which set forth illustrative embodiments in which the principles of the invention are utilized.

BRIEF DESCRIPTION OF THE DRAWINGS

The objects and advantages of the invention will become readily apparent from the following detailed description of various exemplary embodiments thereof in connection with the accompanying drawings, in which like numerals designate like elements, and in which.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons. In the present specification and description, like numerals depict like elements and will be used throughout the remainder of the description.

The present invention is directed to a hitch which is adapted to couple a towed vehicle, such as a trailer, to a towing vehicle. The hitch is designed to be used with many conventional vehicles, such as cars or light trucks, which are not originally equipped with a trailer hitch. The hitch is designed to be portable such that it may be easily mounted to the towing vehicle and removed as needed by a user. The hitch of the present invention eliminates the need to alter the towing vehicle.

Figure 1:
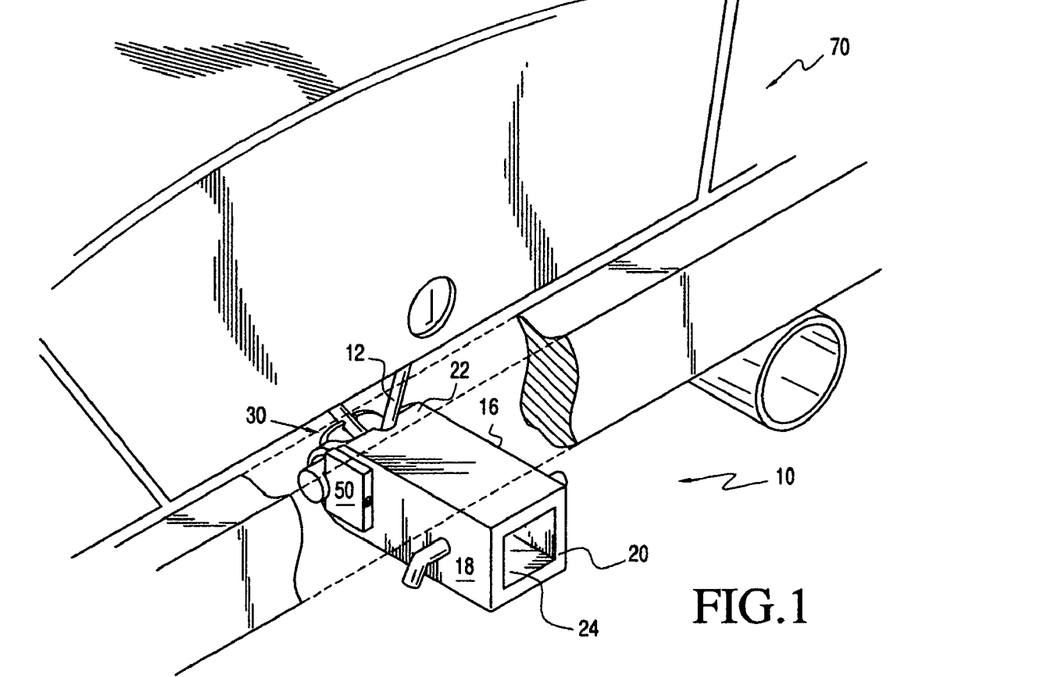
FIG. 1 is a front perspective view of an exemplary embodiment of a hitch, made in accordance with the invention, shown attached to a vehicle.
Figure 2:
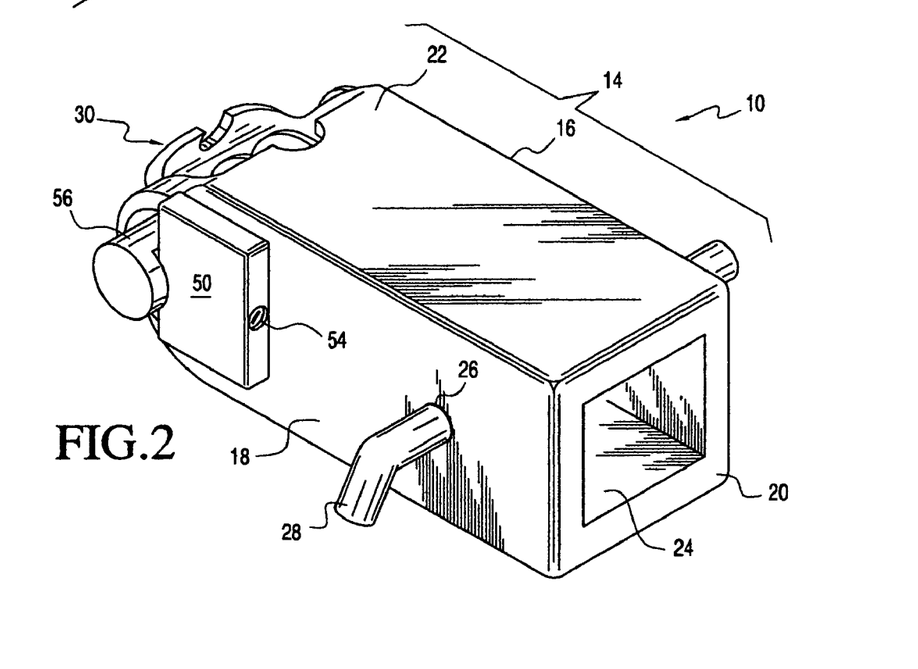
FIG. 2 is a front perspective view of the hitch of FIG. 1, shown without the vehicle.

FIGS. 1 and 2 are front perspective views of an exemplary embodiment of a hitch 10 made in accordance with the present invention. FIG. 1 show hitch 10 attached to a towing vehicle 70 and FIG. 2 shows hitch 10 without vehicle 70. Hitch 10 includes a receiver portion 14 and a connection portion 30. Receiver portion 14 is operably configured to receive a ball mount, not shown. Connection portion 30 is operably configured to engage or attach to vehicle 70. Hitch 10, as will be described in greater detail below, is configured to be coupled to vehicle 70 by a connector 12, which is part of vehicle 70 and is preferably disposed at the rear and under vehicle 70.

As shown in FIG. 1, connector 12 is a bent rod having a generally "U" or "V" shape in a vertical plane and both ends of the rod are generally attached to the vehicle frame. Connector 12 is disposed along the center line of towing vehicle 70 and generally will not be visible to a person standing or walking by vehicle 70. Many vehicles, when purchased by a consumer, are equipped with connector 12 because connector 12 is commonly used as an attachment mechanism for transportation from a manufacturer to the retail businesses. Because connector 12 is commonly already attached to the vehicle, there is generally no need for modification of the vehicle. However, if connector 12 is not a part of the vehicle, it is a simple, unobtrusive and inexpensive modification to add connector 12 to the frame of vehicle 70. This can be accomplished through commonly used methods such as welding. The addition of connector 12 to vehicle 70 does not detract from the appearance of vehicle 70. Connector 12 is shown in the present embodiment as a loop or ring, but may be other shapes as will become more apparent from the discussion below. Once hitch 10 is in place adjacent vehicle 70 such that connector 12 is in an engaging position with connection portion 30 (see FIGS. 1 and 2), a shaft 56 is inserted through connection portion 30 and connector 12 to secure hitch 10 to vehicle 70, as will be discussed further below.

Receiver portion 14 of hitch 10 has a first end 20 and a second end 22, as well as first and second sides 16 and 18. Receiver portion 14 also includes a channel 24.

Figure 4:
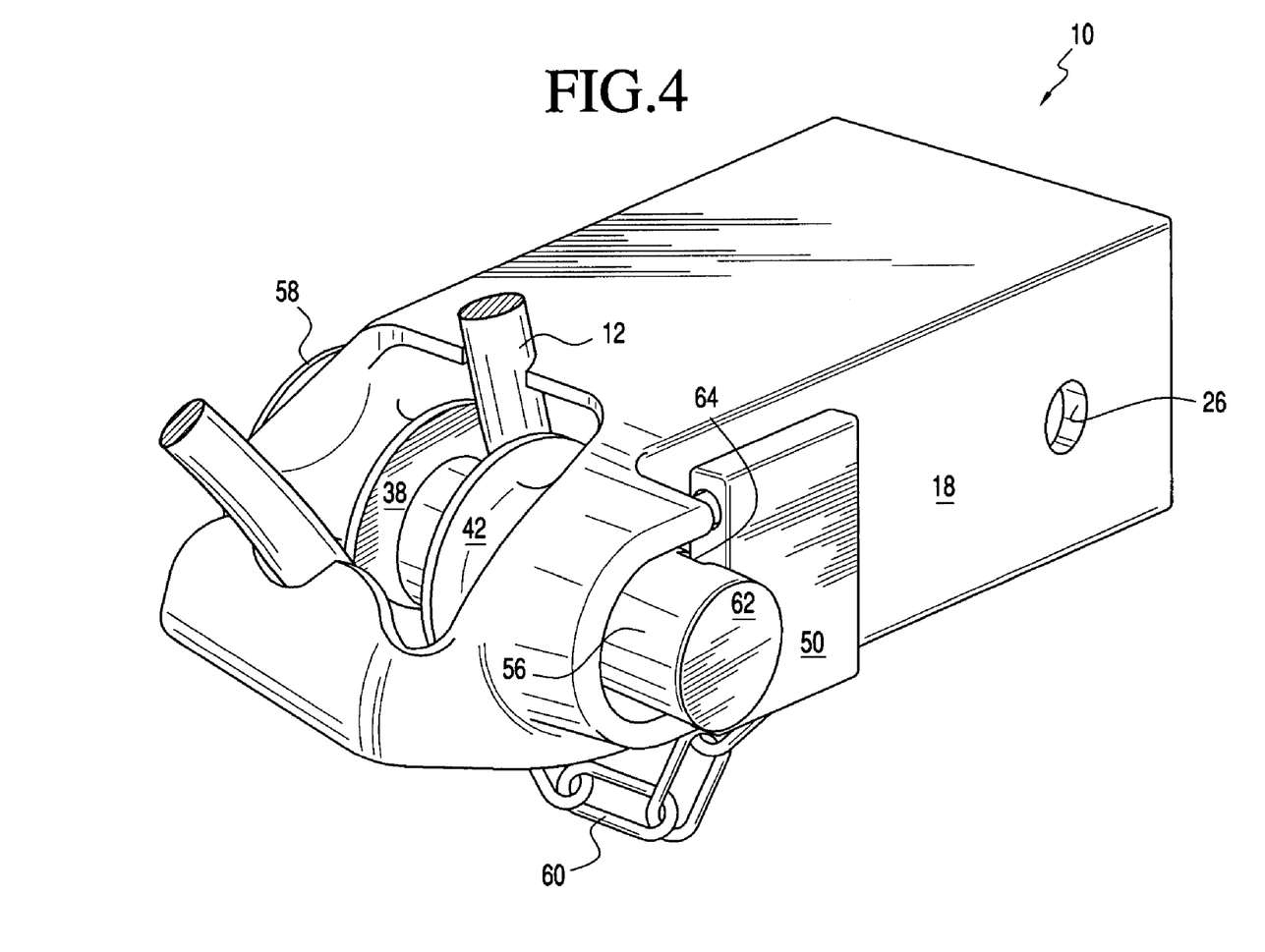
FIG. 4 is a rear view of the fully assembled hitch of FIG. 2 shown attached to a connector portion of the vehicle.

Channel 24 is preferably an interior channel, in that it is a hollow section of receiver portion 14. Channel 24 extends from first end 20 along a portion of the length of the receiver portion 14. It should be appreciated that channel 24 in other exemplary embodiments may extend the entire length of receiver portion 14. Channel 24 is operably configured to receive an elongated square insertion member. Channel 24 is operably configured to receive a conventional ball mount or other insert, not shown. However, it should be appreciated that other shapes may be utilized. Channel 24 includes orifices 26 (as shown in FIG. 4) operably configured to receive a pin 28. A ball mount or other insert is held into place within channel 24 via a pin 28. This is the conventional means that ball mounts engage receivers. Pin 28 extends through orifices 26 in sidewalls 16 and 18 of receiver portion 14. Orifices 26 are preferably coaxially aligned. As would be obvious to one of ordinary skill in the art, the placement of bolt 28 may be changed as needed as the design of the current invention is not dependent on bolt 28 being in a horizontal position or being inserted into a particular first or second side.

Figure 3:
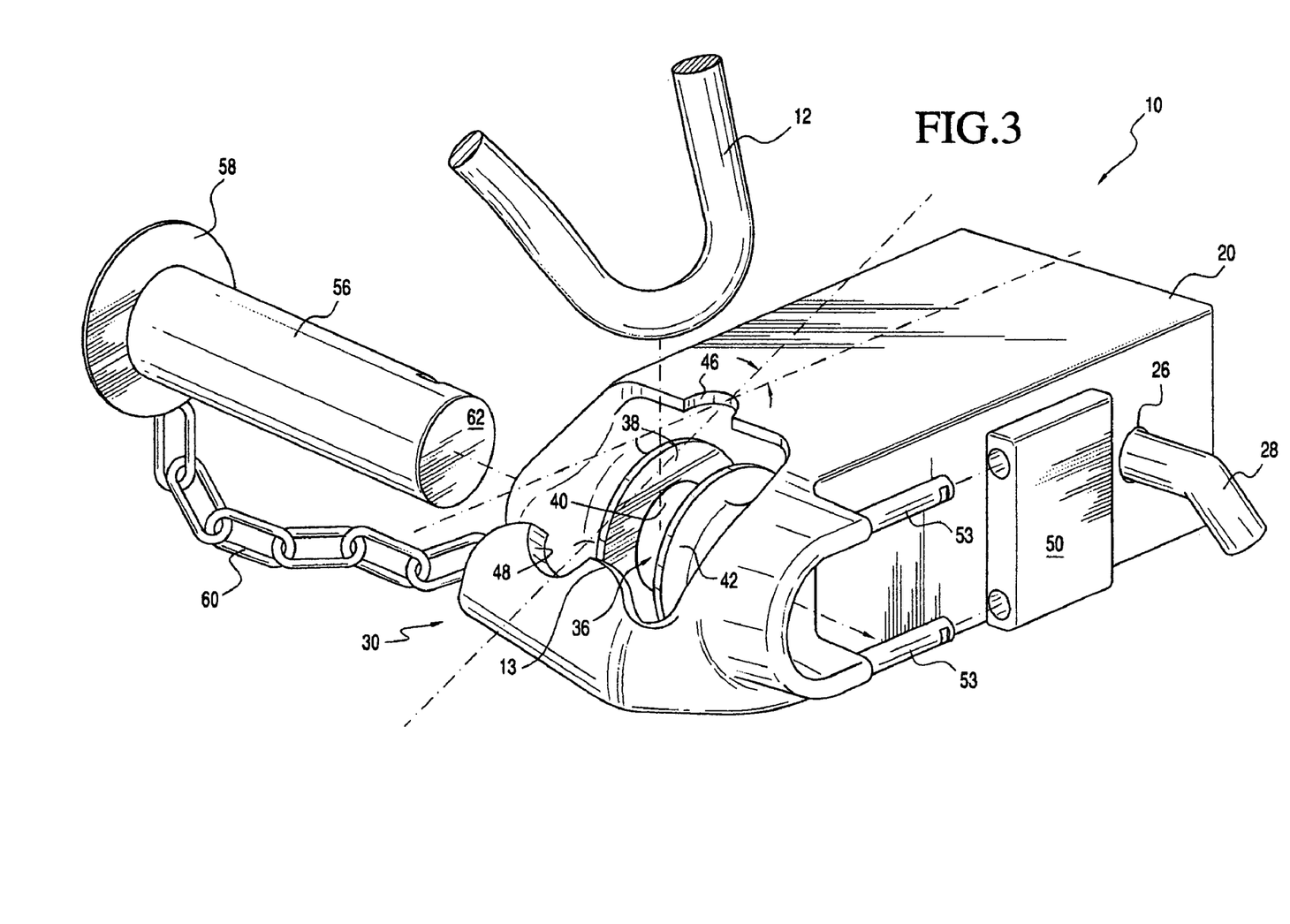
FIG. 3 is an exploded rear perspective view of the hitch of FIG. 2.
Figure 5:
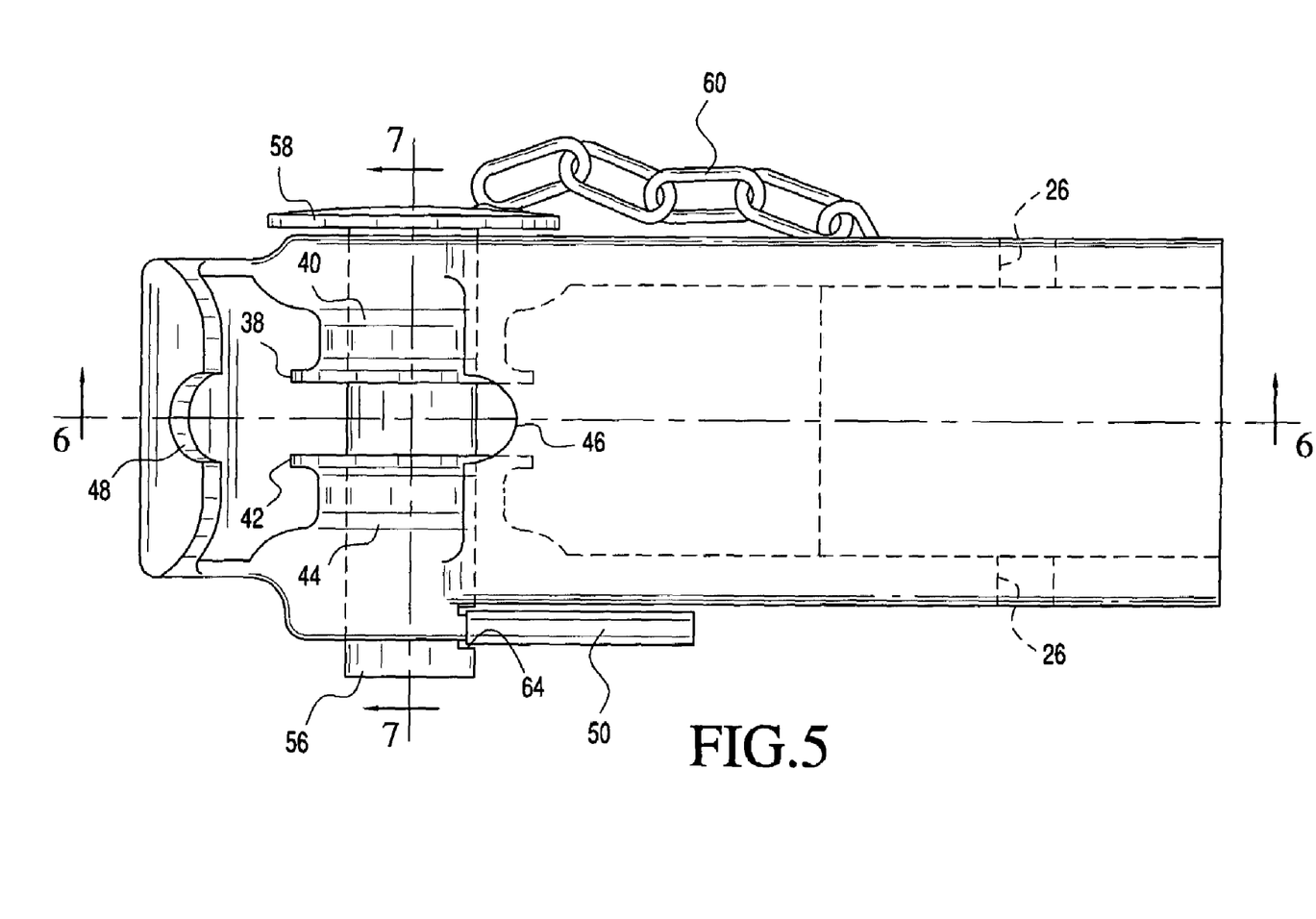
FIG. 5 is a top view of the hitch of FIG. 2.

FIG. 3 is an exploded rear perspective view of hitch 10 with connector 12 of vehicle 70 and FIG. 4 is the same rear perspective view except that it shows the connector 12 engaged with connection portion 30. Connection portion 30 is disposed at second end 22 of receiver portion 14. Connection portion 30 includes a first flange 38 having an orifice 40, a second flange 42 having an orifice 44 (as shown in FIGS. 3 and 5), a first notch 46 and a second notch 48. Orifice 40 and orifice 44 (as shown in FIGS. 3 and 5) are preferably coaxially aligned.

First and second notches 46 and 48 are defined by an edge 13 of the connection portion 30. First and second notches 46 and 48 are preferably aligned along the centerline of the hitch 10. First and second notches 46 and 48 are disposed opposing one another, one along the top edge 13 of connection portion 30 and the other along the bottom edge 13 of connection portion 30. First and second notches 46 and 48 are preferably U-shaped. However, it should be appreciated that other shapes may be utilized so long as it provides proper engagement with connector 12 as discussed below. Further, it should be appreciated that notches 46 and 48 may be part of a continuous ellipse which forms the opening of a chamber.

Referring still to FIGS. 3, 4 and 5 the first and second flanges 38 and 42 are disposed within connection portion 30. It should be appreciated that first and second flanges 38 and 42 may be sidewalls of a bore formed in the connection portion 30 to form the chamber 36. It should also be appreciated that the bottom side of connection portion 30 may also include an opening or openings in other embodiments.

Connection portion 30 further includes a lock 50 with a key insert 54 (shown in FIG. 2.). Once a shaft 56 is inserted through connection portion 30, as will be discussed further below, lock 50, with locking members 53, is set in place to engage shaft 56 and locked via a key, not shown, via key insert 54. Lock 50 is preferably used to secure hitch 10 against theft or disengagement from vehicle 70.

FIGS. 3 and 4 illustrate the positioning of connector 12 as it is inserted into connection portion 30. Connector 12 is positioned between the first flange 38 and the second flange 42. First and second flanges 38 and 42 are positioned apart from each other at such a distance to just allow the thickness of connector 12 to fit there between. For illustrative purposes only, an example of the range of such a distance between first and second flanges 38 and 42 and connector 12 is approximately 1/16 of an inch on all sides. Combined, the maximum clearance would be approximately 1/8 of an inch. These measurements are provided as examples only and are in no way meant to limit the invention as disclosed. This close fit is designed to reduce horizontal swaying movement of hitch 10 relative to vehicle 70.

In addition, as connector 12 is positioned between first flange 38 and second flange 42, connector 12 is disposed against first notch 46 and second notch 48. Opening 34 is of a determined size such that the first notch 46 and second notch 48 are disposed apart from each other to engage connector 12 and to allow connector 12 to be disposed deep enough within the chamber portion 36 (shown in FIG. 7) such that shaft 56 is able to pass through connector 12. It is preferred that first and second notches 46 and 48 engage connector 12 along its length and not at its ends. Notches 46 and 48 prevent pitching or tilting in a vertical direction of hitch 10 relative to vehicle 70. Notches 46 and 48 provide for further stabilization of hitch 10.

In operation, as shown in FIGS. 4 and 5, once connector 12 is inserted into hitch 10 between first and second flanges 38 and 42 and first and second notches 46 and 48, a second end 62 of shaft 56 is positioned or slid through a first side 16 of connection portion 30, through orifice 40 of first flange 38, through the ring or loop made by connector 12, through orifice 44 of second flange 42 and finally through second side 18 of connection portion 30.

Shaft 56 is preferably coupled to hitch 10 by a tether 60. Tether 60 is preferably a chain. It should be appreciated that there are numerous other types of tethers that are available and that could be utilized at tether 60, such as for example, a nylon strap. Tether 60 is coupled to hitch 10 by any means known in the art such as welding or bolting to the hitch.

Shaft 56 also has a first end with a plate 58 to prevent further sliding movement once shaft 56 is inserted through connection portion 30. As discussed in more detail below, shaft 56 also has a shaft notch 64 operably configured to receive lock 50. Once shaft 56 is fully inserted into hitch 10, spring biased lock 50 may be locked such that lock 50 engages locking members 53 and notch 64 to prevent any additional movement or sliding out of shaft 56 as shown in FIG. 4.

In operation, a square insertion member, such as a ball mount (not shown), is inserted into channel 24 of receiver portion 14. A pin or bolt fastener 28 is slid through orifices 26 and the insertion member or ball mount (not shown) to secure the insertion member or ball mount to the hitch 10.

FIG. 5 is a top view of the hitch 10 assembled as shown in FIG. 4, but without connector 12 of vehicle 70. As illustrated further in FIG. 5, first end 58 of shaft 56 includes a plate with a diameter larger than the main body of shaft 56 to keep shaft 56 in place. FIG. 5 also illustrates the engagement between notch 64 of the shaft lock 50, which prevents undesired backing-out of shaft 56.

Figure 6:
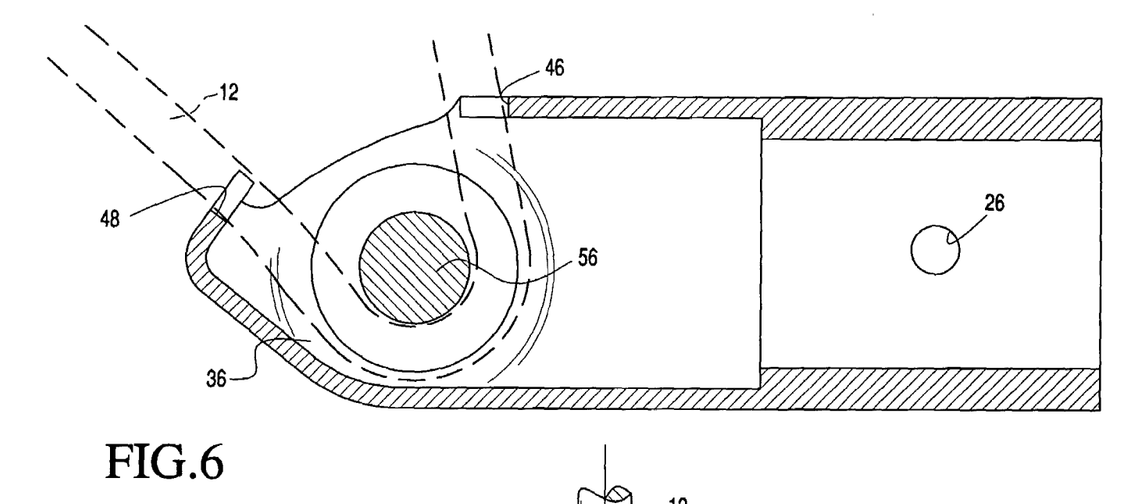
FIG. 6 is a side cross sectional view of the hitch of FIG. 2 taken along line 6—6, in FIG. 5.

FIG. 6 is a cross sectional view of hitch 10 taken along line 6—6 in FIG. 5. As illustrated by FIG. 6, channel 24 is operably configured to accept an elongated square insertion member (not shown). FIG. 6 also further illustrates chamber 36 and notches 46 and 48 in relation to connector 12, shown in phantom. Particularly, FIG. 6 illustrates that notches 46 and 48 engage connector 12 along its length and not at its ends. Engaging connector 12 along its length prevents hitch 10 from coming into contact with the frame or bumper (neither shown) of vehicle 70. Thus, hitch 10, when in use will not damage, scratch, mar or the like vehicle 70.

Figure 7:
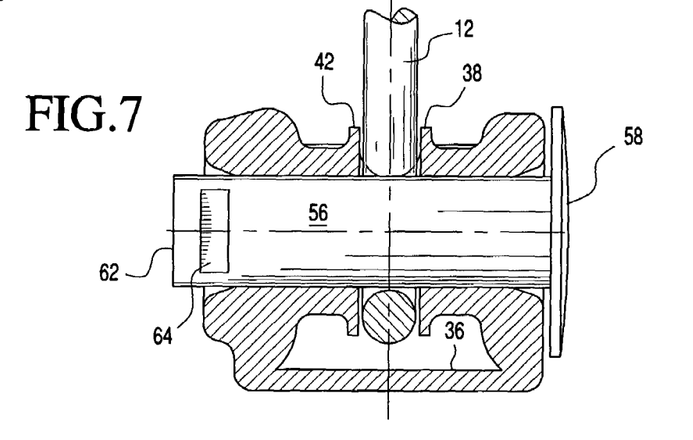
FIG. 7 is a partial cross sectional view of the hitch of FIG. 1 taken along line 7—7, shown in FIG. 5.

FIG. 7 is a partial cross sectional view of the hitch of the present invention taken along lines 7—7, as indicated by the arrows in FIG. 5. FIG. 7 illustrates a partial cross section of the connection portion 30 and a full view of the shaft 56, receiver portion 14 and connector 12. As clearly indicated, shaft 56 has a second end 62 having a notch 64 designed to receive a spring biased lock (not shown). As would be clear to those of ordinary skill in the art, any other lock suitable for the hitch of the present invention may be used. Shaft 56 has a first end with a plate 58 having a diameter larger than shaft 56 to prevent movement once shaft 56 is inserted into receiver portion 14. Also clearly indicated in FIG. 7 are flanges 38 and 42, and chamber 36. As shown, once connector 12 is inserted into receiver portion 14 the flanges 38 and 42 are arranged in such a manner to prevent excessive pitch and yaw movement by hitch 10 in a horizontal direction.

It should be appreciated that notches 46 and 48 and flanges 38 and 42 along with shaft 56, in the above-described embodiment, engage connector 12, in such a manner so as to provide a secure attachment interface for hitch 10. These features can be provided with tight enough tolerances, depending upon the particular dimensions of the connector portion of the particular vehicle, such that very little movement of the hitch relative to the vehicle will be present in horizontal, vertical or rotational directions.

Figure 8:
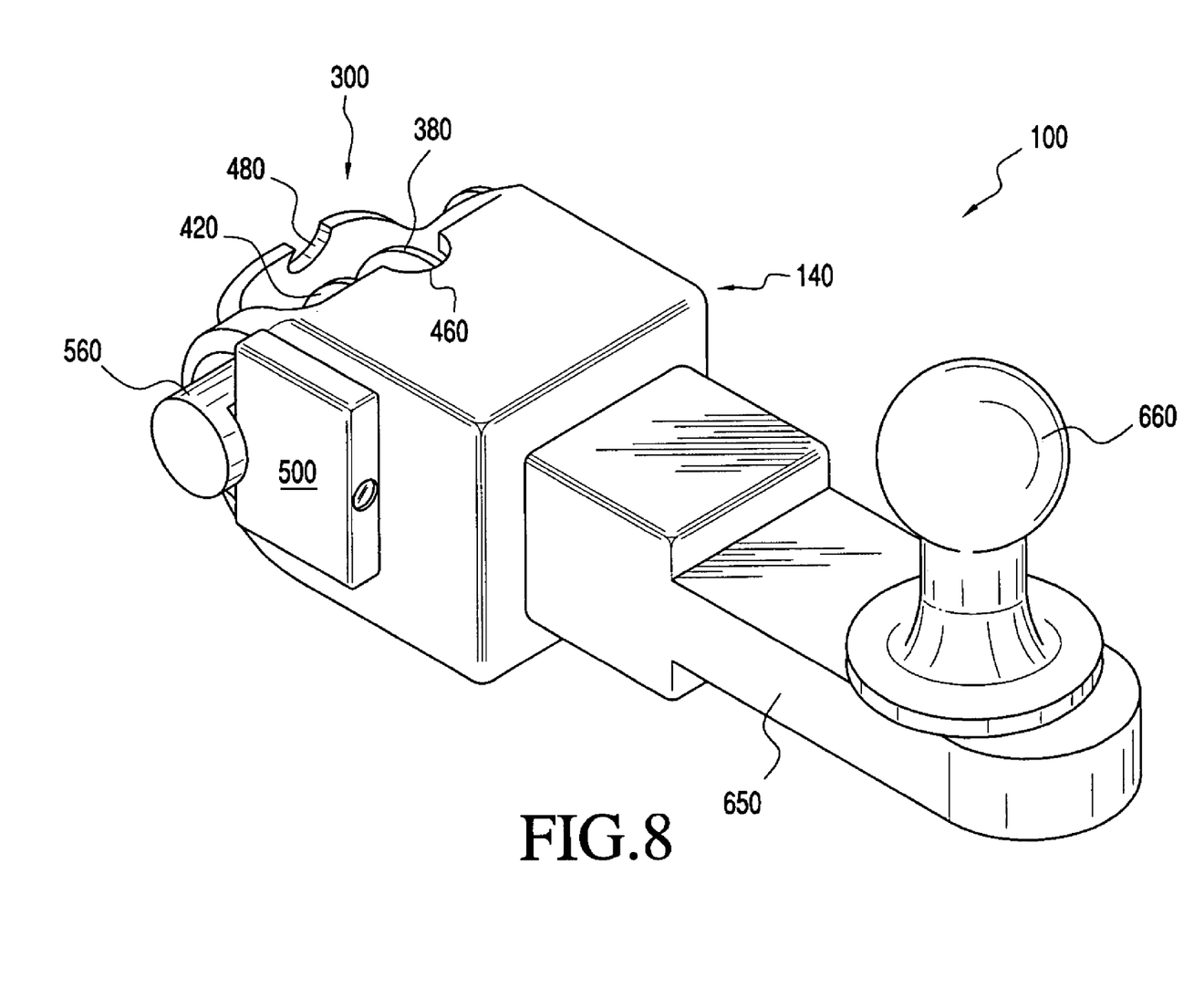
FIG. 8 is front perspective view of an alternative exemplary embodiment of a hitch, made in accordance with the invention; and, FIG. 9 is a broken perspective view of an alternative exemplary embodiment of the hitch, made in accordance with the invention.

FIG. 8 is a perspective view of a hitch 100, which is an alternative embodiment, made in accordance with the invention. Hitch 100 includes similar features and attaches to a vehicle in a similar manner as hitch 10 described above. For example, Hitch 100 includes a receiver portion 140 and a connection portion 300. Connection portion 300 includes similar features as connection portion 30, described above. For example, connection portion 300 includes a shaft 560, a lock 500, notches 460, 480, flanges 380, 420, etc. However, hitch 100 does not have a channel for receiving a ball mount like channel 24 of receiver portion 14 of hitch 10. Rather, hitch 100 includes an integral ball mount 650. Ball mount 650 may be fixed to receiver portion 140 by any means known to those of ordinary skill in the art such as welding, or it may be one unitary piece. Preferably, ball mount 650 and connection portion 300 are disposed at opposing ends of receiver portion 140. A ball 660 is removably attached to ball mount 650.

Figure 9:
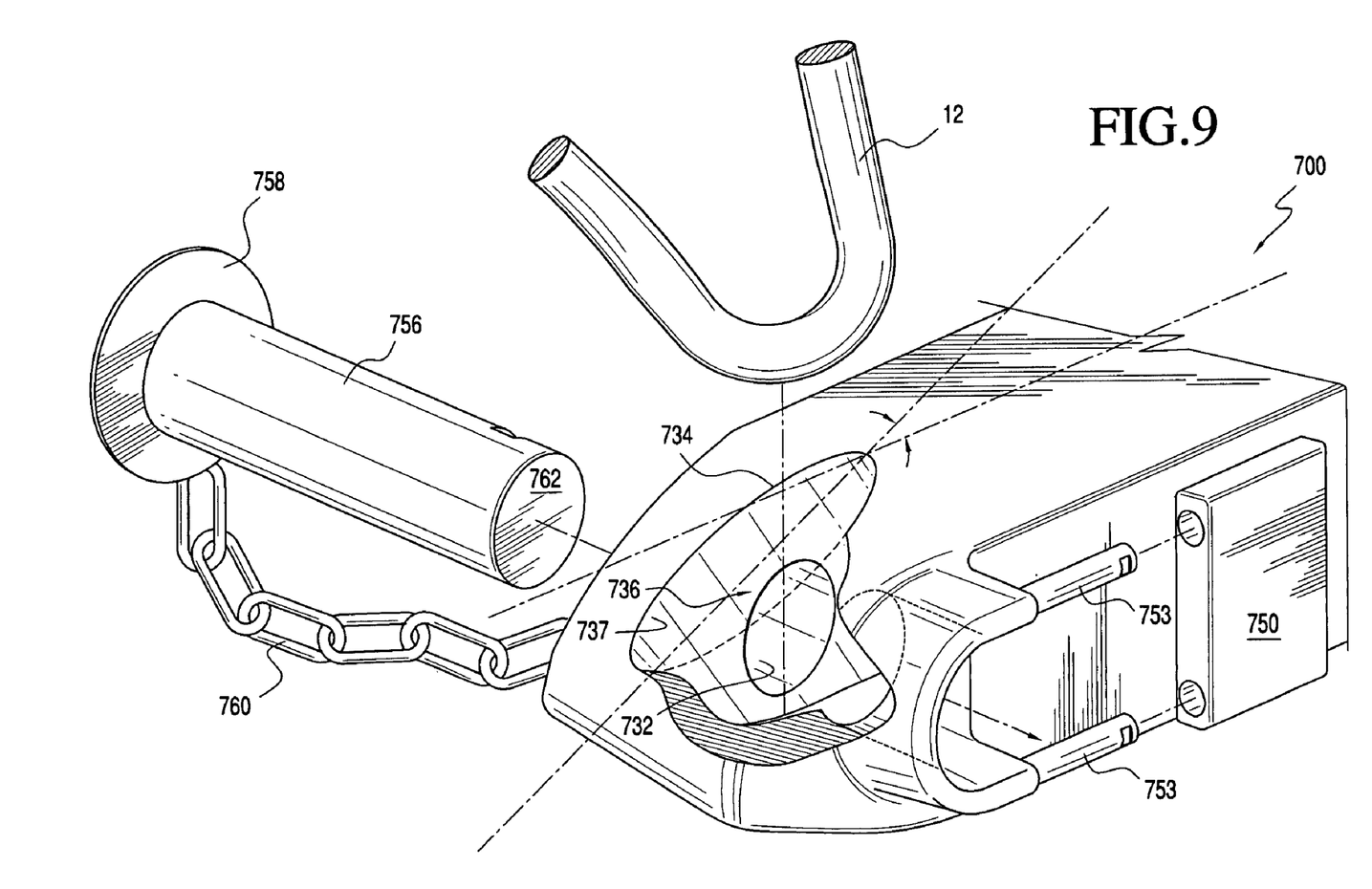

FIG. 9 is a broken perspective view of connection portion 700, which is an alternative embodiment, made in accordance with the invention. Connection portion 700 includes similar features and attaches to a vehicle in a similar manner as the connection portion of hitch 10 described above. For example, connection portion 700 includes a shaft 756, a lock 750 and is operably configured to be attached to a vehicle when connector 12 is inserted. Connection portion 700 is shown in a broken perspective view to better illustrate the chamber 736 and the orifice 732. Connection portion 700 has a chamber 736 that is disposed along the centerline of the device. Chamber 736 is defined by a continuous elliptical edge with an orifice 732 extending through the chamber 736. Chamber 736 has an interior portion defined by sidewalls 737. Orifice 732 has an axis that is substantially perpendicular to the centerline. Connection portion 700 is arranged in such a manner to prevent excessive pitch and yaw movement similar to the device 10 described above.

It should be understood that various alternatives to the embodiments of the disclosed method and hitch described herein may be employed in practicing the disclosed method and using the disclosed hitch. It is intended that the following claims define the scope of the disclosed method and hitch and that methods and structures within the scope of these claims and their equivalents be covered thereby.

What is claimed is:

1. A hitch, comprising:
   a receiver portion;
   a connection portion being disposed adjacent receiver portion and having a chamber with an orifice extending through the chamber, an edge defining an opening of the chamber, first and second notches disposed opposing each other along the edge, and first and second coaxial opposing flanges disposed about the orifice, within the chamber and apart from each other at a predetermined distance.

2. The hitch of claim 1 wherein said receiver portion has a channel operably configured to receive an insert member.

3. The hitch of claim 1 wherein said connection portion is operably configured to receive a connector attached to a towing vehicle.

4. The hitch of claim 1 further comprising a shaft having first and second ends, where said second end inserts into said orifice of said connection portion.

5. The hitch of claim 3 wherein said shaft is coupled to said receiver portion by a tether.

6. The hitch of claim 3 wherein said shaft has a first end with a larger diameter than said orifice.

7. The hitch of claim 3 wherein said shaft further comprises a shaft notch disposed at said second end of said shaft.

8. The hitch of claim 6 wherein said connection portion further comprises a lock that is operably configured to engage said shaft notch.

9. The hitch of claim 1 wherein said receiver portion further comprises two coaxial opposing orifices operably configured to receive a pin.

10. A hitch comprising:
    a connector having first and second ends, wherein both of said first and second ends are preferably attachable to a towing vehicle;
    a receiver portion;
    a union portion disposed adjacent to said receiver portion and having a chamber defined by an edge with an orifice extending through the chamber, first and second notches disposed opposing each other along said edge, and first and second coaxial opposing flanges disposed about said orifice at a predetermined distance from each other; and a shaft having first and second ends, where said second end inserts into said orifice of said connection portion and said first end having a diameter larger than said orifice.

11. The hitch of claim 10 wherein said shaft is coupled to said receiver portion by a tether.

12. The hitch of claim 10 wherein said receiver has a channel operably configured to receive an insert member.

13. The hitch of claim 10 wherein said shaft further comprises a shaft notch disposed at said second end of said shaft.

14. The hitch of claim 10 wherein said union portion further comprises a lock that is operably configured to engage said shaft notch.

15. The hitch of claim 10 wherein said receiver portion further comprises two coaxial opposing orifices operably configured to receive a pin.

* * * * *